US006208779B1

(12) United States Patent
Rowlette, Sr. et al.

(10) Patent No.: US 6,208,779 B1
(45) Date of Patent: Mar. 27, 2001

(54) OPTICAL FIBER ARRAY INTERCONNECTION

(75) Inventors: John Robert Rowlette, Sr., Hummelstown; Michael Aaron Kadar-Kallen, Harrisburg, both of PA (US)

(73) Assignee: Tyco Electronics, Wilmington, DE (US)

( * ) Notice: Subject to any disclaimer, the term of this patent is extended or adjusted under 35 U.S.C. 154(b) by 0 days.

(21) Appl. No.: 09/453,002

(22) Filed: Dec. 2, 1999

(51) Int. Cl.[7] .................................................. G02B 6/26
(52) U.S. Cl. ................................................ 385/17; 385/89
(58) Field of Search .................................. 385/15, 17, 24, 385/89–92, 147

(56) References Cited

U.S. PATENT DOCUMENTS 4,987,407 * 1/1991 Lee ........................................ 340/540
5,782,682 * 7/1998 Cohen et al. ........................... 385/89

* cited by examiner

*Primary Examiner*—James Phan

(57) ABSTRACT

An interconnection system (10) is provided for connecting a plurality of optical arrays (66) to each other. The arrays (66) are terminated with connectors (62, 64) and then cut to form transmit and receive arrays (66). Multiple transmit arrays (66) are terminated in respective rows of a first arrays guide (40, 140). Multiple receive arrays (66) are terminated in respective columns of a second arrays guide (40, 140). The first and second arrays guides (40) are aligned to optically couple the rows of transmit arrays (66) with the columns of the receive arrays (66).

15 Claims, 5 Drawing Sheets

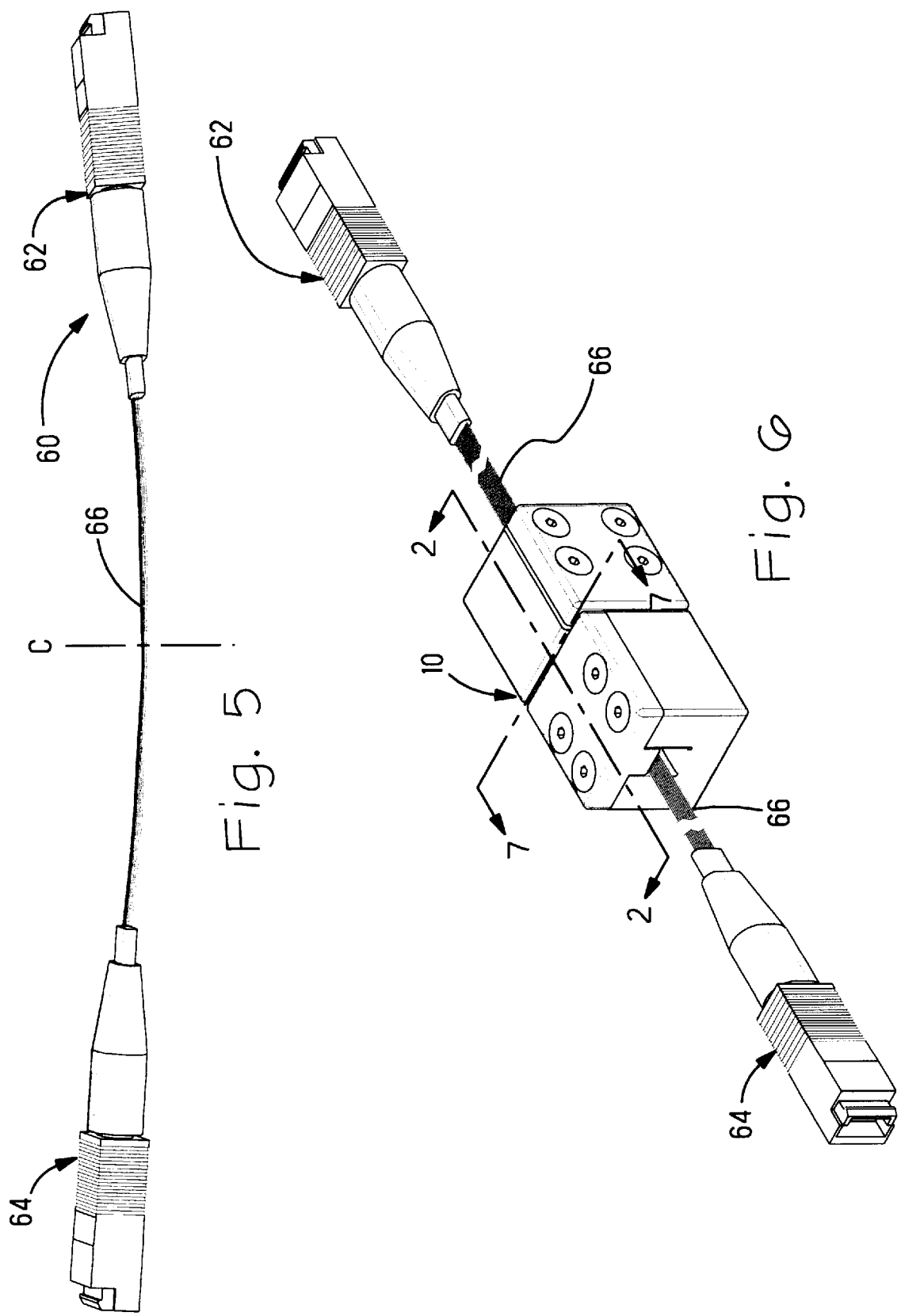

OPTICAL FIBER ARRAY INTERCONNECTION

FIELD OF THE INVENTION

This invention is related to an optical interconnection system and more particularly to a two dimensional array interconnection system.

BACKGROUND OF THE INVENTION

Optical back plane assemblies are commonly used in communication systems. These assemblies typically include a card cage which houses a plurality of circuit boards. Each circuit board has a plurality of electrical optical interfaces that must connect to each of the other circuit boards, for communicating with each of the other circuit boards in the assembly. Each circuit board typically has a plurality of transmit fibers that communicate with corresponding receive fibers that originate from other circuit boards. Each circuit board has a plurality of receive fibers which communicate with the transmit fibers of all other circuit boards. Prior to the invention, each of the transmit fibers on each circuit board is connected typically to point to a respective receive fiber of another circuit board. Similarly, each of the receive fibers on each circuit board is connected typically to point to a respective transmit fiber of another circuit board. This point to point connection system creates a large number of fiber optic cables in the rear end of the card cage that need to be connected together, for example, by creating a wiring type harness. Testing and rework becomes extremely difficult with such an arrangement. Additionally, if a wiring type harness is created for providing the point to point connections, a faulty connection in the harness may result in a need for replacement of the entire harness, as compared with the difficulty of searching the harness for the faulty connection.

SUMMARY OF THE INVENTION

It is therefore an object of the invention to provide an interconnection system for an optical back plane which eliminates a need for a harness, and allows ease of assembly, testing and repairing with minimal labor and defective parts.

The invention provides a two dimensional array interconnection system which includes transmit arrays that may extend from optical connectors of respective circuit boards, and receive arrays of optical fibers that may extend from optical connectors of the respective circuit boards. The invention provides a two dimensional array interconnection system having the plurality of transmit arrays of each of the circuit boards are assembled into a first arrays guide that distributes and positions the transmit arrays of each of the circuit boards in a first orientation. The plurality of receive arrays of each of the circuit boards are assembled into a second arrays guide that distributes and positions the receive arrays of each of the circuit boards in a second orientation. The first and second arrays guides meet each other at mating ends such that the first orientation lies orthogonal to, or perpendicular to, the second orientation, whereby each transmit array of each of the circuit boards points to a receive array of another of the circuit boards. According to one embodiment, at least one of the transmit arrays of each circuit board points to one of the receive arrays on the same circuit board, which provides a channel of communication within each circuit board itself, which enables each circuit board to transmit and receive signals for communications within the circuit board itself.

According to an alternative embodiment, the arrays omits one of the transmit arrays, and the receive arrays guides omits a corresponding one of the receive arrays, which eliminates a channel of communication within each circuit board itself.

DESCRIPTION OF THE DRAWINGS

The invention will now be described by way of example with reference to the accompanying figures of which:

FIG. 5 shows a three dimensional view of a terminated ribbon array used in a step of the assembly shown in FIG. 6.

FIG. 6 shows a three dimensional view of a partially a interconnection as shown in FIG. 1.

DETAILED DESCRIPTION OF THE PREFERRED EMBODIMENTS

Figure 1:
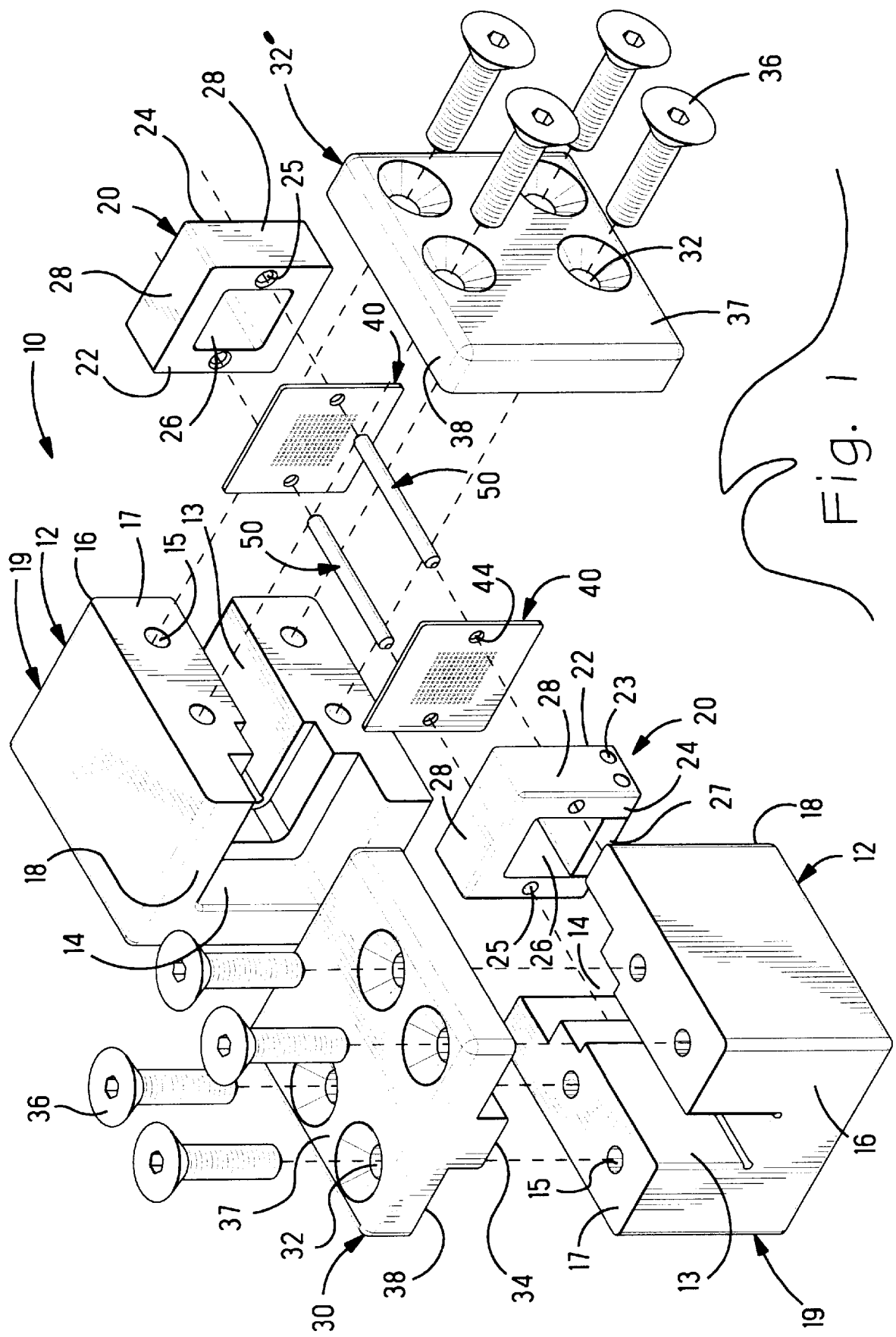
FIG. 1 shows an exploded three dimensional view of the array interconnection system according to the present invention.

Referring first to FIG. 1 the interconnection system 10 will be generally described. The interconnection system 10 consists of a pair of cable strain reliefs 12, a pair of guide strain reliefs 20, a pair of array guides 40, 40 and a pair of guide pins 50. Each arrays guide 40, 40 is assembled to a mating end 22 of a respective array strain relief 20. Each array strain relief 20 is assembled into a termination receiving area 14 of the respective cable strain relief 12. Each assembly including a cable strain relief 12, array strain relief 20, and an arrays guide 40 defines a mating half of the interconnection system 10. The guide pins 50 are used to align the mating halves to each other to form the interconnection. It should be understood that the mating halves are secured to each other by fasteners, for example, or the interconnection system 10 can be placed into a housing (not shown), which housing serves to secure the mating halves to each other. Once they are secured or once they are in a housing the interconnection system may be mounted to a larger assembly such as a card cage.

Figure 3:
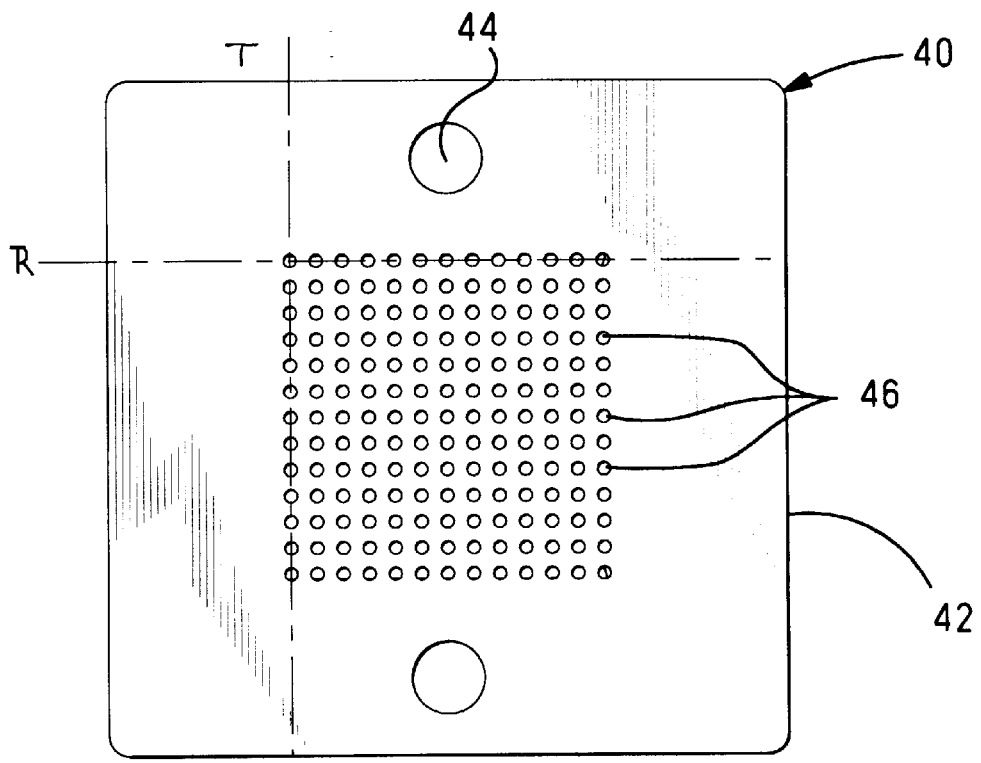
FIG. 3 shows an and view of an arrays guide shown in FIG. 1.

Each of the major components will now be described in greater detail. Referring first to FIG. 3, which shows an end view of one arrays guide 40. Each arrays guide 40, 40 is a thin plate formed of a planar material such as a polymer. The arrays guide 40 has outer edges 42 and a series of array receiving openings 46 formed within the outer edges 42. The array receiving openings 46 are arranged in rows and columns. A plurality of alignment openings 44 are formed in precise relationship to the array receiving openings 46. All of these openings 46, 44 pass through the plate thickness of the array guide 40. The arrays guide 40 is similar to the arrays guide 40, as having the rows and columns of openings 46 and the openings 44. The openings 46 are formed in each of the arrays guides 40 and 40 by a known YAG Laser machine to provide a matrix of mesh openings 46 through the thin plate of polymer material.

The array strain relief 20 as best shown in FIG. 1 is a body formed of a solid material and has a plurality of end walls 28, a mating face 22, and a rear face 24. A plurality of alignment openings 25 extend from the mating face 22 to the rear face 24 and are formed in precise relationship to a array receiving cavity 26 which also extends between the faces 22, 24. Optionally, a removable wall 27 may be provided proximate the array receiving cavity 26. A plurality of securing openings 23 extend through an wall 28 and the removable wall 27 to secure the removable wall 27 between two end walls 22.

The cable strain relief 12 will now be described in greater detail with reference again to FIG. 1. This strain relief 12 is also formed of a solid material in two major parts. First, the base 90 is formed to have a cable receiving cavity 13 extending between a rear face 16 and a mating face 80 the cable receiving cavity 13 extends from the rear face 16 toward a termination receiving cavity 14 disposed at the mating end. A plurality of securing openings 15 are provided along a joining surface 17. A cover 30 or 32' having a complementary joining surface 38 and a plurality of through holes 32 extending from an outer surface 37 to the joining surface 38. An abutment surface 34 extends from the joining surface 38 into the cable receiving cavity 13. A plurality of suitable fasteners 36 such as screws are insertable into the openings and through holes 16,32.

Assembly of the interconnection system 10 will now be described in greater detail with reference to FIGS. 1, 2, 3, 5 and 6. First, optical arrays 66, preferably a ribbon optical fiber or alternately a bundle of single optical fibers, is terminated on both ends as shown in FIG. 5 with optical connectors 62, 64. This termination can be accomplished by well known techniques in the optical arts. The assembly consists of the arrays 66 terminated to optical connectors 62, 64 that are components of one circuit board that uses the optical fibers to communicate with other circuit boards. Alternatively, the connectors 62, 64 could be replaced with either a group of single fiber ferrules or multi-fiber ferrules on each end of the fibers of the arrays 66. The assembly 60 is then tested to insure the optical connectors 62, 64 or terminations are properly terminated. Next, the arrays 66 are cut at a location indicated by the line "C" in FIG. 5, to provide transmit arrays fibers connected to a first of the connectors 62, 64, and to provide receive arrays fibers connected to a second of the connectors 62, 64.

It should be understood that multiple transceivers communicate with one another with multiple optical transmit arrays and multiple optical receive arrays, which are connected with circuit boards of the transceivers. The circuit boards of the transceivers are provided with transmit arrays or fibers 66 with cut ends and receive arrays or fibers 66 with cut ends. Each of the circuit boards will have its transmit arrays or fibers 66 assembled into openings 46 in a corresponding one row of the arrays guide 40. Further, each of the circuit boards will have its receive arrays or fibers 66 assembled into openings 46 in a corresponding one column of the arrays guide 40.

The cut ends of the transmit arrays fibers are terminated to a respective arrays guide 40, by inserting the arrays of fiber ends into respective array receiving openings 46, followed by securing them in place by applying epoxy, and if necessary, followed by, polishing the cut ends flush with the guides to reduce optical reflection. The cut ends of the receive arrays fibers are terminated to a respective arrays guide 40 by inserting the arrays of fiber ends into respective array receiving openings 46, followed by securing them in place by applying epoxy, and if necessary, followed by, polishing the cut ends flush with the guides to reduce optical reflection.

Each arrays guide 40, 40 having a plurality of arrays or fibers 66 is assembled to an array strain relief 20 at the mating end 22. Guide pins 50 are inserted into the openings 44, 25 to align the array guide 40 to the array strain relief 20 at the mating end 22. This assembly is then inserted into the termination receiving area 14 of the cable strain relief 12. To complete the assembly of the first mating half, the cover 30 is assembled to the base 19. Similarly, the other mating half is assembled and aligned with the alignment pins 50 such that the two array guides 40 engage each other in a precisely aligned relationship, mating end 22 to mating end 22, wherein respective array receiving openings 46 of one array guide 40 are precisely aligned with respective openings 46 in the other array guide 40. An epoxy may be wicked around the periphery of the aligned array guides 40, 40 in order to assure good optical coupling. The mating halves are secured to each other, for example, by fasteners such as epoxy or screws. Further, the mounting halves can be secured to each other, for example, by having the entire interconnection system 10 enclosed by a housing (not shown) and assembled into a larger assembly such as a card cage. FIG. 6 shows a partially assembled interconnection system 10 wherein one set of arrays 66, corresponding to one of the circuit boards, is inserted into each mating half. It should be understood that a plurality, twelve arrays 66, in this example, corresponding to twelve circuit boards, are insertable into each cable receiving cavity 13.

Figure 2:
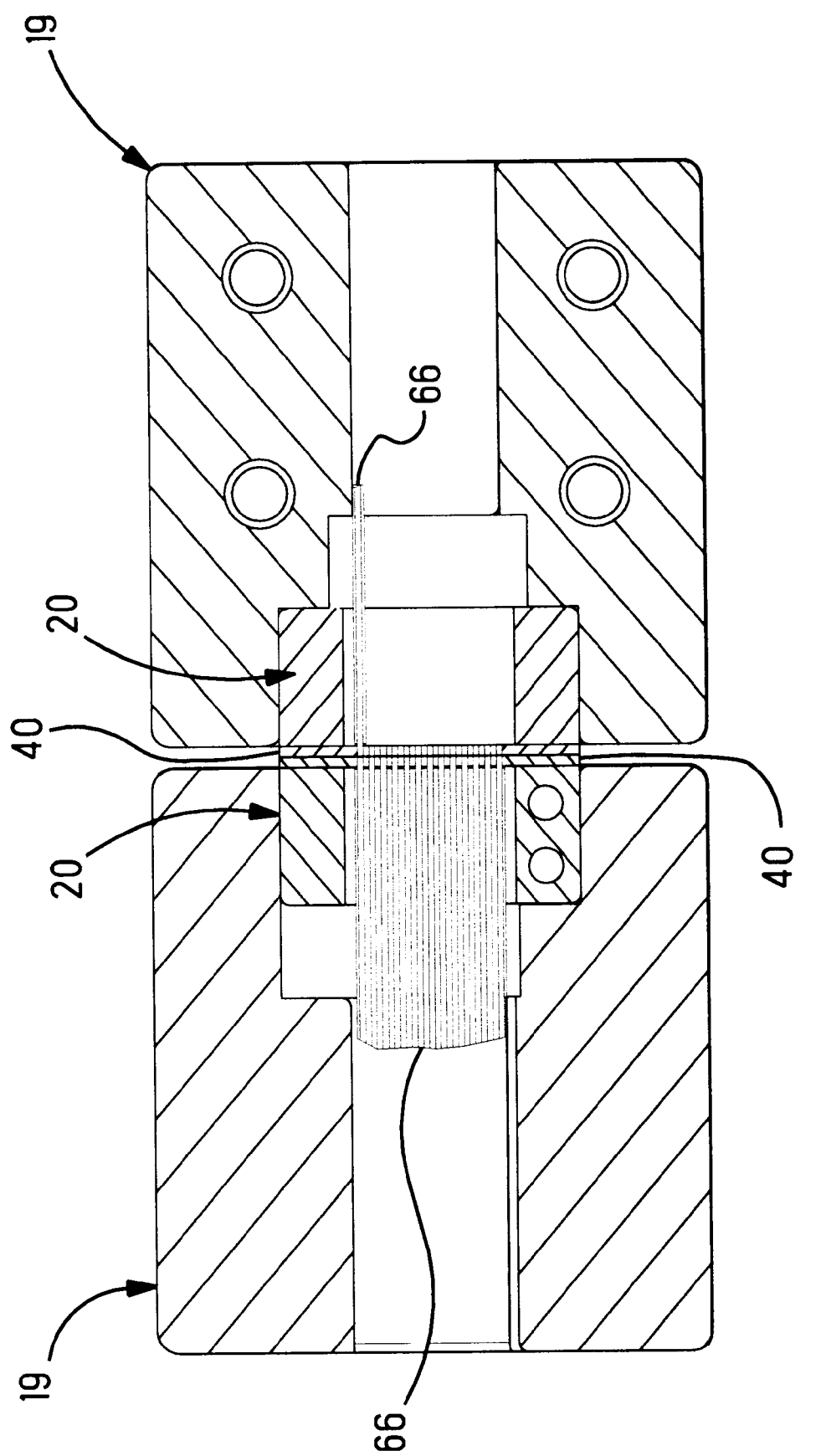
FIG. 2 shows a cross sectional view of the interconnection system taken along the line 2—2 of FIG. 6.
Figure 7:
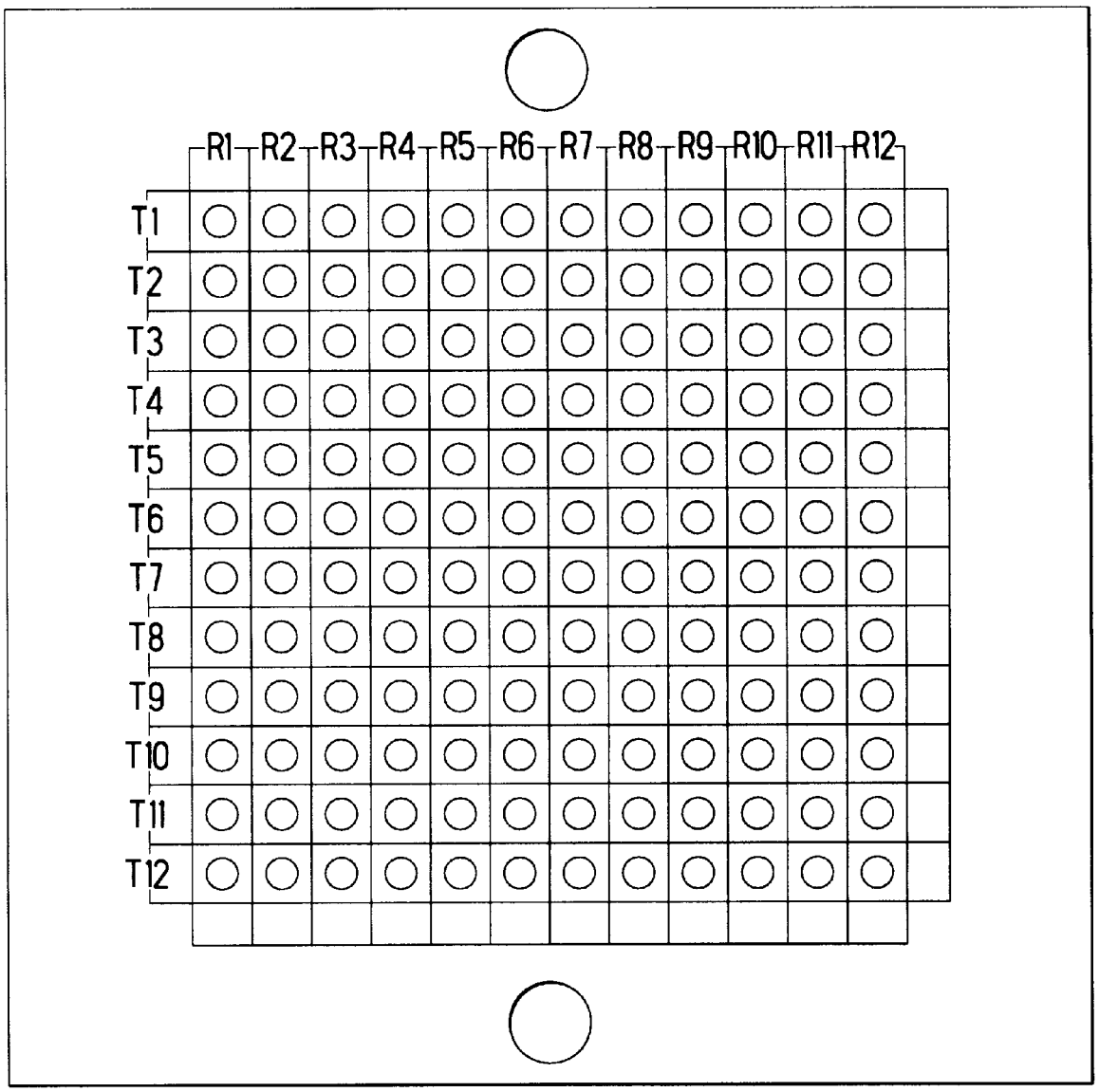
FIG. 7 shows a cross sectional view or the assembled arrays guides taken along the line 7—7 of FIG. 6.

It should also be noted in FIG. 6 and in FIG. 2 that the circuit boards have their transmit arrays or fibers 66 oriented in rows, and have their receive arrays or fibers 66 oriented in columns, the rows and columns being orthogonal or perpendicular to each other, such that when viewed at the connection interface between the aligned arrays guides 40, 40 the relationship shown in FIG. 7 will exist. It can be seen in FIG. 7 that the transmit array fibers 66 labeled T1 . . . T12 of a first of the circuit boards are arranged in the first arrays guide 40 in a row of openings 46 parallel to the T plane, while the receive array fibers 66 of the same, first of the circuit boards, are labeled R1 . . . R12, and are arranged in the second arrays guide 40 in a column of openings 46 parallel to the R plane.

The sequence of assembly is repeated for each of the circuit boards in turn, wherein, each of the circuit boards, in turn, has its transmit arrays of fibers inserted into a row of openings 46 in the arrays guide 40, and has its receive arrays of fibers inserted into a column of openings 46 in the arrays guide 40. The assembly continues, until each of the circuit boards has its transmit arrays of fibers in a corresponding row of openings 46 in the arrays guide 40, and has its receive arrays of fibers in a corresponding column of openings 46 in the arrays guide 40.

In the finished assembly, each of the twelve circuit boards has its twelve transmit arrays fibers T1–T12 in twelve openings 46 in a corresponding single row in the arrays guide 40. There are twelve circuit boards and twelve rows of transmit arrays fibers. Each column has twelve openings 46 having twelve transmit arrays or fibers T1–T12 of the same circuit board.

Further, in the finished assembly, each of the twelve circuit boards has its twelve receive arrays or fibers R1–R12 arranged in a corresponding single column in the arrays guide 40. There are twelve circuit boards and twelve columns of receive arrays or fibers. Each column has twelve openings 46 having twelve receive arrays or fibers R1–R12 of the same circuit board. Further, each of the twelve circuit boards has its twelve transmit arrays fibers T1–T12 overlapping different columns of receive arrays or fibers R1–R12, such that any one of the twelve circuit boards has its twelve transmit arrays or fibers T1–T12 in one row aligning with, pointing to, twelve receive arrays fibers R1–R12 that are in different twelve columns that correspond to the twelve circuit boards. Thus, when the openings 46 of the arrays guide 40 are aligned with the openings 46 of the arrays guide 40, each of the twelve circuit boards has its transmit arrays 40 fibers aligned with the receive arrays fibers of the twelve circuit boards.

Further, each circuit board has its row of the transmit arrays overlapping its column of the receive arrays. As a result, one of the transmit arrays of each circuit board points to one of the receive arrays on the same circuit board, which provides a channel of communication within each circuit board itself, and which enables each circuit board to transmit and receive signals for communications within the circuit board itself. For example, as shown in FIG. 7, the first row of transmit arrays or fibers overlap the first column of receive arrays or fibers. Thus, at least one transmit fiber, fiber T1, is in alignment with, pointing to, the receive fiber R1 on the same, first circuit board. This provides a channel of communication within the same, first circuit board itself. Such channel of communication occurs between the transmit fiber T1 at an overlap of the T plane row with the receive fiber R1 in the column of the R plane column.

Similarly, the second circuit board has a corresponding second row of transmit arrays or fibers overlapping a corresponding second column of its receive arrays or fibers. Thus, at least one transmit fiber, fiber T2, is in alignment with, pointing to, the receive fiber R2 on the same, second circuit board.

Similarly, the third circuit board has a corresponding third row of transmit arrays or fibers overlapping a corresponding third column of its receive arrays or fibers. Thus, at least one transmit fiber, fiber T3, is in alignment with, pointing to, the receive fiber R3 on the same, second circuit board.

Thus, each N circuit board will has a corresponding N row of its transmit arrays or fibers overlapping a corresponding N column of its receive arrays or fibers. Thus, at least one $T_N$ transmit array or fiber is in alignment with, pointing to, a corresponding receive array or fiber $R_N$ at an overlap of the N row and the N column, which provides a channel of communication within each N circuit board itself, and which enables each N circuit board to transmit and receive signals for communications within the N circuit board itself. The openings 46 in the arrays guides 40, 40, which provide channels of communication within the respective circuit boards themselves, are those that correspond to the arrays fibers, T1, R1 . . . T2, R2 . . . $T_N$, $R_N$, which corresponds to the diagonal through the rows and columns of openings 140.

It should be understood that this interconnection system 10 is intended to connect a plurality of arrays fibers to a second plurality of arrays fibers. For example this interconnection system is suitable for use in an application such as a communications system having a plurality of electronic circuit boards wherein each of the respective circuit boards have the connectors 62, 64 and have a plurality of transmit fibers T1–T12 arranged in a row, and have a plurality of receive fibers R1–R12 arranged in a column. Therefore, transmit channels on a circuit board would communicate with respective receive channels on the other circuit boards by way of the transmit fibers, with the transmit fiber arrays 66 arranged in the first array guide 40 in rows parallel to the orthogonal T plane, and with the receive fibers arrays 66 arranged in columns parallel to the orthogonal R plane of the other array guide 40.

Figure 4:
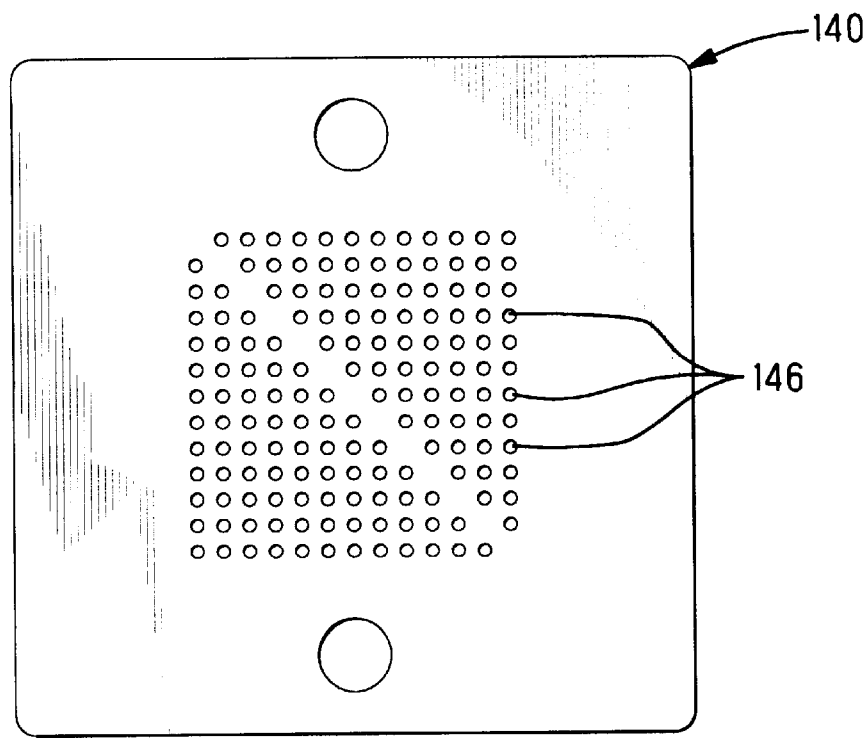
FIG. 4 shows an end view of an alternate arrays guide.

An alternate embodiment that is used for either of the transmit and receive array guides is shown in FIG. 4. The alternate embodiment, array guide 140 is similar to each of the array guides 40 and 40 of FIG. 3, with the openings 146 of FIG. 4, corresponding to the openings 46 of FIG. 3, except that the opening 146 is eliminated at the overlap of the row of openings 146 with the column of openings 146 that correspond to the arrays fibers, T1, R1 . . . T2, R2 . . . $T_N$, $R_N$. As shown in FIG. 4, the eliminated array receiving openings are those that would have been along the diagonal through the rows and columns of openings 146. Thus, the openings 146 that are eliminated, are the openings for receiving the arrays fibers, T1, R1 . . . T2, R2 . . . $T_N$, $R_N$.

As shown in FIG. 4, the twelve rows of openings 146 each have a twelfth opening 146 added to the end of each of the twelve rows. In one of the arrays guides 140, the twelfth openings receive the twelfth transmit arrays or fibers, respectively, of the twelve circuit boards. Further, as shown in FIG. 4, the twelve columns of openings 146 each have a twelfth opening 146 added to the end of each of the twelve columns. In a second of the arrays guides 46, the twelfth openings receive the twelfth receive arrays or fibers, respectively, of the twelve circuit boards. When the two guides 140 are aligned, none of the twelfth openings having the transmit arrays or fibers overlaps with any of the twelfth openings having the receive arrays or fibers. Accordingly, each circuit board has all of its transmit arrays or fibers T1–T12 terminated to the first arrays guide 140, and all of its receive arrays or fibers R1–R12 terminated to the second arrays guide 140 without communication between a transmit array or fiber and a receive array or fiber of the same circuit board.

The invention provides a two dimensional arrays organizer that distributes and orients transmit arrays fibers in a two dimensional, transmit arrays guide in the form of rows of openings through the transmit arrays guide. Further, the invention provides a two dimensional arrays organizer that distributes and orients receive arrays fibers in a two dimensional, receive arrays guide in the form of rows of openings through the receive arrays guide.

An advantage of this invention is that it provides a pre-tested, easily assembled array interconnection which minimizes point to point connection errors. Each fiber array 66 is pre-terminated and tested before assembly into the respective array guide 40 to form a larger array. Therefore, defective components can be serviced or replaced prior to final assembly. Also, because of the perpendicular planes of arrangement respective to the two array guides 40 and 40 (and respective to the alternate two array guides 140 and 140), the possibility for erroneous point to point connections is minimized.

Although preferred embodiments of the invention have been disclosed, other embodiments and modifications are intended to be covered by the spirit and scope of the appended claims.

We claim:

1. An optical interconnection system for optical transmit arrays and optical receive arrays comprising:
   the transmit arrays being arranged in a first guide such that the transmit arrays are disposed in first orientations,
   the receive arrays being arranged in a second guide such that the receive arrays are disposed in second orientations that are orthogonal to the first orientations, and
   the first guide and the second guide are aligned with selected ones of the first and second orientations being aligned with one another.

2. The optical interconnection system as recited in claim 1 wherein, at least one of the transmit arrays is not aligned with any of the receive arrays, and at least one of the receive arrays is not aligned with any of the transmit arrays.

3. The optical interconnection system as recited in claim 1, and further comprising: the first guide having at least one row of openings receiving respective transmit arrays, and the second guide having at least one column of openings receiving respective receive arrays.

4. The optical interconnection system as recited in claim 1 wherein, the first of the guides is a plate with at least one row of openings receiving respective transmit arrays.

5. The optical interconnection system as recited in claim 1 wherein, the second of the guides is a plate with at least one column of openings receiving respective receive arrays.

6. The optical interconnection system as recited in claim 1 and further comprising: the arrays extending in strain reliefs having mating ends, and the guides being mounted on the mating ends.

7. The optical interconnection system as recited in claim 1 and further comprising: guide pins aligning the guides with each other.

8. The optical interconnection system as recited in claim 1, and further comprising: the first guide having at least one row of openings receiving respective transmit arrays, the second guide having at least one column of openings receiving respective receive arrays, and the row and the column are not overlapping each other.

9. The optical interconnection system as recited in claim 1 and further comprising: the first guide having at least one row of openings receiving respective transmit arrays, the second guide having at least one column of openings receiving respective receive arrays, and the row and the column overlap each other.

10. The optical interconnection system as recited in claim 1 and further comprising: the transmit arrays in first orientations comprises the transmit arrays in rows, and the receive arrays in second orientations comprises the receive arrays in columns.

11. A method of making an optical interconnection system comprising the steps of:

providing a plurality of optical arrays, terminating opposite ends of the arrays, severing the arrays to provide first transmit arrays and first receive arrays, orienting the first transmit arrays in a first row of a first guide, orienting the first receive arrays in a first column of a second guide that is adapted to be aligned with the first guide such that the first column is orthogonal to the first row, orienting additional transmit arrays in additional rows of the first guide, orienting additional receive arrays in additional columns of the second guide, and aligning the first and second guides, whereby the first transmit arrays align with the additional receive arrays, and the first receive arrays align with the additional transmit arrays.

12. The method of making an optical interconnection system, as recited in claim 11, and further comprising the step of:

aligning the first row to overlap the first column such that one of the first transmit arrays aligns with one of the first receive arrays.

13. The method of making an optical interconnection system, as recited in claim 11, and further comprising the step of:

aligning the first row without overlapping the first column such that none of the first transmit arrays aligns with any of the first receive arrays.

14. The method of making an optical interconnection system, as recited in claim 11, and further comprising the step of:

aligning each of the additional rows to overlap each of the additional columns, such that one of the additional transmit arrays in each of the additional rows aligns with one of the additional receive arrays in each of the additional columns.

15. The method of making an optical interconnection system, as recited in claim 11, and further comprising the step of:

aligning each of the additional rows to overlap the additional columns, with the exception of not overlapping a corresponding one of the additional columns, whereby the additional transmit arrays in the additional rows align with the additional receive arrays in the additional columns, with the exception of not aligning with the additional receive arrays in said corresponding one of the additional columns.

* * * * *